United States Patent [19]

Ueda

[11] Patent Number: 4,702,921
[45] Date of Patent: Oct. 27, 1987

[54] METHOD FOR PREPARING FISH-EGG-LIKE EDIBLE PRODUCTS

[75] Inventor: Tsunesuke Ueda, Hino, Japan

[73] Assignee: Q.P. Corporation, Japan

[21] Appl. No.: 824,424

[22] Filed: Jan. 31, 1986

[51] Int. Cl.$^4$ ............................ A23D 5/00; A23L 1/04
[52] U.S. Cl. ......................................... 426/48; 426/98; 426/104; 426/276; 426/575; 426/576; 426/602
[58] Field of Search ................... 426/89, 98, 276, 575, 426/602, 48, 52, 104, 576

[56] References Cited

U.S. PATENT DOCUMENTS

| | | | |
|---|---|---|---|
| 3,085,015 | 4/1963 | Schram | 426/276 |
| 3,922,360 | 11/1975 | Sneath | 426/89 X |
| 4,202,908 | 5/1980 | Nesmeyanov et al. | 426/575 X |
| 4,375,481 | 3/1983 | Kuwabara et al. | 426/575 X |
| 4,507,327 | 3/1985 | Ueda | 426/276 |

*Primary Examiner*—Robert Yoncoskie
*Attorney, Agent, or Firm*—Jordan B. Bierman

[57] ABSTRACT

A method for preparing fish-egg-like edible products like salmon roe consisting of capsules of thin gel membranes filled with an oil material and a viscous fluid separately contained therein comprising surrounding a viscous emulsion consisting of the viscous fluid and the oil material with calcium alginate membranes and separating the viscous emulsion into the viscous fluid and the oil material and the fish-egg-like edible product.

19 Claims, 2 Drawing Figures

METHOD FOR PREPARING FISH-EGG-LIKE EDIBLE PRODUCTS

BACKGROUND OF THE INVENTION

This invention relates to a method for preparing fish-egg-like edible products which are very similar to fish eggs such as salmon roe both in appearance and taste.

With shortage of marine resources, specifically of eggs of salmon, trout, and other fish, development of edible products which are similar to fish eggs both in appearance and taste has been attempted.

In connection with such fish-egg-like edible products, Japanese Patent Application Laying-open No.99177/1980 proposes a method for preparing artificial fish eggs which uses a multiple tube nozzle. The eighth embodiment of the proposed invention uses a triple tube nozzle to obtain artificial fish eggs of a triple structure in which a triple-structured liquid drop consisting of salad oil as an innermost section, a first layer sol containing a water solution of gelatin, pectin, and sodium alginate as a next outer section, and a second layer sol containing gelatin and sodium alginate as an outermost section is dropped into a calcium lactate solution.

However, the proposed method has the problem in that it requires a specific device and the resultant artificial fish eggs have a structure in which the outermost layer is a gel layer with a substantial thickness and the oil layer is at the center of the egg.

Observing a fish egg, specifically the structure of a salmon roe, it is not gelled over the entire egg, but is covered with thin gel membranes, and an oil component and a viscous liquid are separately contained in the inside of the membranes.

Therefore, the artificial fish eggs obtained by the proposed method are never similar to fish eggs in appearance and taste.

SUMMARY OF THE INVENTION

With a view to obviate all of the prior art defects of artificial fish eggs, it is a primary object of the present invention to provide a method for preparing fish-egg-like edible products which are very similar to fish eggs both in appearance and taste and to provide the novel product produced thereby.

In accordance with the present invention which attains the above objects, there is provided a method for preparing fish-egg-like edible products in which an aqueous phase and an oil phase are separately contained in the inside of membranes consisting of calcium alginate by using a first procedure consisting of steps a through c, or a second procedure consisting of steps a' through c', or a third procedure consisting of steps a" through c" as shown below.

a. Preparing an emulsion comprising a viscous fluid consisting of an aqueous sol material and water, a calcium salt, and an oil material.

b. Forming capsules by dropping the emulsion into an alginate solution and thereby surrounding the dropped emulsion with membranes of calcium alginate.

c. Separating the encapsulated emulsion into the aqueous phase consisting of the viscous fluid and the oil phase consisting of the oil material by heating the capsules.

a'. Preparing an emulsion comprising the viscous fluid consisting of the aqueous sol material and water, pasted starch, the calcium salt, and the oil material.

b'. Forming capsules by dropping the emulsion into an alginate solution and thereby surrounding the dropped emulsion with membranes of calcium alginate.

c'. Separating the encapsulated emulsion into the aqueous phase and the oil phase by soaking the capsules in an aqueous solution of amylase.

a". Preparing an emulsion comprising the viscous fluid consisting of the aqueous sol material and water pasted starch, the calcium salt, and the oil material.

b". Forming capsules by dropping the emulsion into an alginate solution containing amylase and thereby surrounding the dropped emulsion with membranes of calcium alginate.

c". Separating the encapsulated emulsion into the aqueous phase and the oil phase by soaking the capsules in water.

The first procedure according to the present invention provides fish-egg-like edible products comprising capsules consisting of calcium alginate membranes filled with an aqueous phase and an oil phase which are separately contained inside the capsules, by surrounding an emulsion prepared from a viscous fluid consisting of an aqueous sol material and water and an oil material with capsules consisting of calcium alginate membranes, followed by separating the encapsulated emulsion into the aqueous phase and the oil phase by heating the capsules.

The second or third procedure according to the present invention provides fish-egg-like edible products by surrounding the emulsion to which is previously added pasted starch with the capsules, followed by separating the encapsulated emulsion into the aqueous phase and the oil phase by decomposing the pasted starch by the function of amylase.

In the first procedure according to the present invention, use of a small quantity of surface active agent such as a fatty acid ester of cane sugar, a fatty acid ester of sorbitan, or lecithin in the heating step provides clearer separation of the emulsion within the capsules into the aqueous phase and the oil phase.

The method according to the present invention allows an oil phase consisting of the oil material and an aqueous phase consisting of the viscous fluid to be separately encapsulated, thereby providing edible products which are very similar to fish eggs in appearance. Moreover, the aqueous phase in the capsules has a particular viscosity, thereby providing a close resemblance to fish eggs also in taste.

Use of xanthene gum, gelatin, and locust bean gum provides the viscous fluid with a particular viscosity which is very close to that of fish eggs, thereby providing a close resemblance to salmon roe.

DETAILED DESCRIPTION OF THE INVENTION

Figure 1:
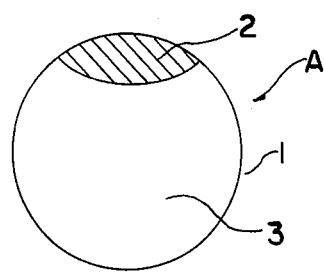
FIG. 1 is a cross-sectional view of a capsule A of fish-egg-like edible products according to the present invention, in which numeral 1 indicates membranes, numeral 2 is an oil phase consisting of an oil material encapsulated in the capsule A, and numeral 3 is an aqueous phase consisting of a viscous fluid encapsulated in the capsule A.

The present invention provides a method for preparing fish-egg-like edible products in which an oil phase consisting of an oil material and an aqueous phase consisting of a viscous sol fluid are separately encapsulated in thin gelled membranes, as in salmon roe, by surrounding an emulsion, which is prepared by emulsifying the viscous fluid and the oil material, with calcium alginate membranes, followed by heating the emulsion to separate it into the aqueous phase consisting of the viscous fluid and the oil phase consisting of the oil material.

The viscous fluid used in the present invention is a viscous liquid having a fluidity which is obtained by dissolving one or more aqueous sol materials selected from the group consisting of locust bean gum, guar gum, xanthene gum, gelatin, carrageenin, and furcellaran (Danish agar) in water, followed by heating and cooling, and smashing or crushing if it is gelled. If necessary, a water-soluble food coloring matter such as a gardenia color and/or a water-soluble extract of fish meat or oyster may be added to the viscous fluid.

The oil material used in the present invention consists of one or more animal and/or vegetable oils selected from the group consisting of soybean oil, rapeseed oil, fish oil, and lard, and if necessary, added with a fat-soluble coloring matter such as carotene and/or a fat-soluble preserver such as tocopherol.

The aqueous sol material is added to water, and the mixture is stirred by a normal method while it is heated to obtain the viscous fluid. The amount of the aqueous sol material is preferably 0.5 to 3.0% by weight based on the weight of water, and the heating temperature is preferably 40° to 90° C. Since a calcium salt such as calcium chloride or calcium lactate is required for the formation of membranes of the capsules, it is preferable to previously add calcium chloride or calcium lactate in water together with the aqueous sol material. Addition quantity of the calcium salt is 0.5% by weight or more based on the weight of the water, normally about 1%. Furthermore, it is preferable to add a low-molecular weight sugar such as glucose or cane sugar to water for adjusting the specific gravity of the emulsion so that drops of the emulsion easily sink into the alginate solution when it is dropped into the solution.

Then the viscous fluid is cooled to obtain a gelled matter. The gelled matter is smashed or crushed to obtain a viscous fluid again, using a mixer or a crusher such as a COMIT ROLL of Laboratory Urshel, U.S.A. When the gelled matter is homogenized, it is sheared into fine particles and its gel property is lost.

When an aqueous sol material other than xanthene gum, such as locust bean gum, guar gum, gelatin, or carrageenin, is used in combination with xanthene gum, if these aqueous sol materials are mixed from the beginning, viscosity of the resulting fluid will be too high, resulting in difficulty of capsule formation in a successive process. In such a case, a viscous fluid based on xanthene gum and that based on another aqueous sol material are separately prepared, and combined immediately before preparing the emulsion. Since a hot water solution of a gum substance such as xanthene gum does not gel when it is cooled, the above described smashing or crushing is not required.

Then the oil material is added while the viscous fluid is stirred in a mixer to obtain the emulsion.

The emulsion is dropped into a water solution of an alginate (sodium alginate or potassium alginate), thereby surrounding the emulsion with membranes of calcium alginate to form capsules. Reaction to form the capsules can be conducted by a known method. For example, the emulsion is added dropwise into the alginate solution so that emulsion drops of 2 to 8 mm in diameter are formed and the drops do not adhere to each other.

When the emulsion is dropped into the solution, the drops of the emulsion sink into the solution, and capsules of calcium alginate membranes with a sufficient strength are formed after immersion for 1 to 5 minutes.

Then the capsules formed are taken out of the solution, and for example soaked and heated in hot water to separate the emulsion in the capsules into the oil phase consisting of the oil material and the aqueous phase consisting of the viscous fluid and at the same time to replace unreacted calcium chloride and sugars in the capsules with water through the calcium alginate membranes, thus removing these components from the capsules.

The water temperature should be adjusted at 45° C. or higher, preferably at 70° to 90° C. If the water temperature is lower than 45° C., reduction of viscosity of the emulsion will not take place and the separation process will not proceed. The heating time is preferably 10 to 60 minutes depending on size of the capsules.

The above emulsion uses an aqueous material consisting of the viscous fluid as an emulsifier, and can be prepared so that it has a viscosity within the range of 2,000 to 40,000 centipoises at normal temperature. The emulsion having such a viscosity range will become a pseudothixotropic gel. Therefore, when the emulsion is dropped into an alginate water solution to prepare capsules, and the resulting capsules are heated at a temperature of 45° C. or higher, viscosity of the emulsion in the capsules rapidly decreases to 5 to 500 centipoises, and the emulsion separates into the oil phase consisting of the oil material and the aqueous phase consisting of the viscous fluid. When the emulsion is separated into the aqueous phase and the oil phase by heating the capsules, use of a small quantity of surface active agent will provide clearer separation.

The surface active agent used in the present invention is a substance having both a hydrophilic group and lipophilic group such as a fatty acid ester of cane sugar, a fatty acid ester of sorbitan, or lecithin. Among these, the fatty acid ester of cane sugar is preferable for the present invention.

The surface active agent can be contained in the emulsion or the alginate water solution. When the surface active agent is to be contained in the emulsion, it can be added when preparing the viscous fluid, into the oil material, or when the viscous fluid and the oil material are emulsified.

The surface active agent is added in amounts of 5 to 1,000 ppm, preferably 50 to 200 ppm, of the total weight of the capsules formed. If the quantity of the surface active agent is less than 5 ppm, the emulsion will be incompletely separated. On the other hand, if the surface active agent is added exceeding 1,000 ppm, the emulsion is separated, however, a white turbid layer of the surface active agent will be produced on the surface of the separated oil phase, which is undesirable for the purpose.

The functions of the surface active agent used in the present invention will now be described in detail.

The surface active agent is normally used as an emulsifier for emulsifying an oil material and an aqueous material. However, a small quantity of the surface active agent acts as a destructor to emulsion. When the emulsion is in a state liable to separate, a small quantity of the surface active agent which is previously added to the emulsion acts as the destroyer of the emulsion to clearly separate the emulsion in the capsules into the oil phase consisting of the oil material and the aqueous phase consisting of the viscous fluid.

The capsules obtained can be used as fish-egg-like edible products as they are, however, if the viscous fluid in the capsules is unseasoned, the capsules can be immersed in a condiment liquid, an aqueous material, to replace water in the viscous fluid of the capsules with the condiment liquid, thereby providing taste similar to that of fish eggs. The above hot water soaking process can be substituted by soaking and heating in the condiment liquid, with or without prior soaking in water. The condiment liquid can be any type, for example, a salmon meat extract and/or a gardenia color is used for providing a state similar to salmon roe. The condiment liquid can also be added with 0.01 to 0.1% of calcium chloride to maintain an adequate hardness of the membranes of the resulting fish-egg-like edible products.

The surface active agent can also be added to the soaking water or the condiment liquid to obtain the normal effect of the surface active agent.

The second and third procedures for preparing fish-egg-like edible products according to the present invention will now be described.

The viscous fluid is obtained using the aqueous sol material and water in the same manner as in the first procedure according to the present invention.

Then pasted starch is separately prepared by a normal method. For example, starch is added to water, and heated with stirring until it is pasted. The starch can be any type such as wheat starch, corn starch, or rice starch. Processed starch which is easily converted to alpha starch can be easily pasted and readily decomposed by amylase and is preferably used for the purpose. The starch may also be combined with the aqueous sol material and heated together with the aqueous sol material to convert it to paste when the viscous fluid is prepared, thereby eliminating the starch paste preparation process.

The viscous fluid and the pasted starch prepared above are placed in a mixer, and admixed with an oil material with agitation to obtain an emulsion. If the oil material is emulsified too finely, the particles are liable to leak through the calcium alginate membranes during the subsequent hot water soaking process. Therefore, the oil material is preferably dispersed to coarse particles of about 100 microns in diameter. Viscosity of the resultant emulsion is preferably 2,000 to 10,000 centipoises. The oil material can be rapidly emulsified since the emulsification process uses the viscous fluid and pasted starch as emulsifiers. Weight ratios of the viscous fluid, the pasted starch, and the oil material can be flexibly selected according to the purpose, and it is preferable to use weight ratios of 7 : 1.7 : 1.3 to obtain fish-egg-like products similar to salmon roe.

The emulsion is dropped into an alginate water solution such as of sodium alginate or potassium alginate and thereby surrounding the emulsion with calcium alginate membranes to form capsules. The capsule formation process can be conducted in the same process as of the first procedure according to the present invention.

Finally the capsules are taken out of the solution and soaked in water of PH4.5 to 6.0 containing amylase, thereby absorbing amylase into the capsules. The amylase decomposes the pasted starch contained in the emulsion to low-molecular weight sugars and eliminates the emulsifying property of the viscous fluid in the emulsion. The capsules are soaked in soaking water at 45° C. or higher, preferably 55° to 60° C., for 10 hours or more, preferably for 15 to 20 hours. The calcium alginate membranes of the capsules are thin films of a network structure which permits low-molecular weight components to pass through, and the amylase contained in soaking water is absorbed into the capsules together with water passing through the membranes. The amylase in the capsules reacts with the pasted starch contained in the emulsion to decompose it to low-molecular weight sugars. At the same time, the viscous fluid in the capsules is heated to the water temperature, the viscosity is reduced, and its emulsifying property is lost. As the decomposition and heating process proceeds, since the decomposition products of the pasted starch, low-molecular weight sugars, have no emulsifying capability and the other emulsifier, the viscous liquid, no longer has any emulsifying property, the emulsion in the capsules may not be maintained in a stable emulsion state and separates into the oil phase and the aqueous phase in the initial stage of soaking. In the final stage of soaking, excess calcium salt which is not consumed for the formation of the membranes, sugars added for specific gravity adjustment, and low-molecular weight sugars produced by the decomposing action of the amylase are replaced with water through the membranes, thereby removing these components from the capsules to obtain fish-egg-like products.

The amylase is not always necessary to be contained in soaking water, and can be contained in the alginate water solution. In this case, temperature of the solution is adjusted at 40° to 65° C., preferably at 55° to 60° C. to promote the decomposing action of the amylase. The capsules are taken out of the solution and soaked in water to replace calcium chloride and low-molecular weight sugars with water through the calcium salt membranes, thereby removing these components from the capsules. Time for the water soaking is preferably 5 to 15 hours depending on size of the capsules and degree of decomposition of the pasted starch. If the emulsion is incompletely separated into the oil phase and the aqueous phase during water soaking, the capsules can be taken out of soaking water and immersed in hot water at about 70° C. for clear phase separation.

The water soaked fish-egg-like products can be immersed into a condiment liquid to replace water in the aqueous phase in the capsules with the condiment liquid (aqueous material) for closer resemblance to fish eggs in appearance and taste. Any types of condiment liquid can be used, for example, extracts such as anchovy sauce and fish extract and a food coloring matter such as a gardenia color are added to water for obtaining fish-egg-like edible products similar to salmon roe. The condiment liquid can also be added with 0.01 to 0.1% of calcium chloride which is absorbed into the capsules together with the condiment liquid, thereby preventing breakage of the fish-egg-like edible products caused by softening of the membranes.

As described above, since the second and third procedures according to the present invention use the viscous fluid and the pasted starch as emulsifiers for the emulsion, the oil material can be easily emulsified. The emulsion is encapsulated, and the capsules are soaked in water containing amylase, thereby easily separating the emulsion into the oil phase and the aqueous phase.

Referring to FIG. 1, by the method according to the present invention, an oil phase 2 consisting of the oil material and an aqueous phase 3 consisting of the viscous fluid are separately encapsulated with alginate membranes 1, thereby forming capsules A.

When the capsules A are cooled to a room temperature, the aqueous phase 3 consisting of the viscous fluid is thickened to a viscosity of 1,000 to 5,000 centipoises, thereby obtaining capsules having a taste similar to fish eggs.

Figure 2:
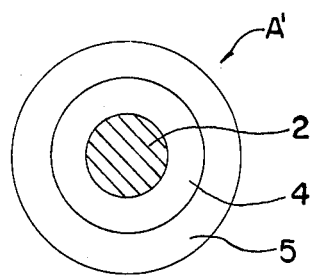
FIG. 2 is a cross-sectional view of a capsule A' of prior art eyeball-like encapsulated edible products, in which numeral 2 indicates an oil layer surrounded with a sol layer 4, and numeral 5 indicates a gel layer surrounding the oil layer 2 and the sol layer 4.

On the other hand, referring to FIG. 2, since prior art fish-egg-like edible products are prepared by using a triplet tube nozzle, they are in the form of a capsule A' which consists of a sol layer 4 surrounding a spherical oil layer 2 and a gel layer 5 surrounding the sol layer 4. Therefore, they have an eyeball-like appearance, not in the form of fish eggs like those obtained according to the present invention. Moreover, because of the gel layer 5 included, they provide a taste which is slightly different from that of fish eggs.

Since the aqueous phase consisting of the aqueous material encapsulated in the fish-egg-like edible products according to the present invention contains a soft gel material such as carrageenin or agar, it has a particular viscosity that provides fish-egg-like edible products having a taste similar to that of fish eggs. Specifically, use of xanthene gum, gelatin, and locust bean gum provides the viscous fluid with a particular viscosity which is very close to that of fish eggs, thereby providing a close resemblance to salmon roe.

Preferred embodiments of the present invention when applied to fish-egg-like edible products will now be described in detail.

FIRST EMBODIMENT

(1) Preparation of a carrageenin base 1.2 part by weight of carrageenin, 10 parts by weight of glucose, and 1 part by weight of calcium chloride are added to 87.8 parts by weight of water, and the mixture is heated at 75° C. with stirring to obtain a carrageenin base.

Note: Hereinafter part means part by weight unless otherwise noted.

(2) Gelation of the carrageenin base

The carrageenin base is kept at 15° C. for 30 minutes to obtain a gelled matter.

(3) Preparation of a viscous fluid

The gelled matter obtained is sheared to fine particles by a Poppart mixer to obtain a viscous fluid.

(4) Preparation of an emulsion 89.9 parts of the viscous fluid are placed in a separate Poppart mixer, and 10 parts of soybean salad oil containing 0.1 part of β-carotene are poured into the mixer with agitation to obtain an emulsion.

(5) Formation of capsules

The emulsion is formed into drops of 6 mm in diameter through a nozzle of 5 mm in inner diameter, and added dropwise to a 0.8 weight % sodium alginate water solution at a rate of 100 drops per minute. The emulsion drops sink into the solution and are surrounded with membranes of calcium alginate to form capsules. The capsules are swelled with water to a diameter of about 8 mm after they are kept immersed in the solution for 2 minutes, and then taken out of the solution.

(6) Hot water soaking

The capsules are soaked in hot water at 75° C. for 60 minutes. The emulsion clearly separates into the oil phase and the aqueous phase about 10 minutes after the start of soaking. The capsules shrink to a diameter of about 6 mm at the end of hot water soaking.

(7) Dipping in a condiment liquid

The capsules taken out of water are dipped into a condiment liquid containing 0.1 weight % of calcium chloride, 5 weight % of anchovy sauce, and 2 weight % of a gardenia color for about 10 hours, thereby obtaining edible products which are similar to salmon roe.

SECOND EMBODIMENT

(1) Preparation of a xanthene gum base 0.6 part of xanthene gum, 13 parts of glucose, and 1 part of calcium chloride are added to 84.8 parts of water, the mixture is heated at 80° C. with stirring, and cooled to 30° C., thus obtaining a xanthene gum base.

(2) Preparation of a carrageenin base 0.5 part of carrageenin, 0.6 part of gelatin, 1.3 part of locust bean gum, 13 parts of glucose, 1 part of calcium chloride, and 0.01 part of a fatty acid ester of cane sugar are added to 83.59 parts of water, and the mixture is heated at 80° C. with stirring to obtain a carrageenin base.

The carrageenin base is cooled to 30° C. to obtain a gelled matter.

The gelled matter obtained is crushed to a fluid state by using a Comit Roll.

(3) Preparation of a viscous fluid

Immediately prior to emulsifying, 3 parts of the xanthene gum base and 7 parts of the fluidized carrageenin base are mixed to obtain a viscous fluid.

(4) Preparation of an emulsion 89.9 parts of the viscous fluid are placed in a Poppart mixer, and 10 parts of soybean salad oil containing 0.1 part of β-carotene are poured into the mixer with agitation to obtain an emulsion.

(5) Formation of capsules

The emulsion is formed into drops of 6 mm in diameter through a nozzle of 5 mm in inner diameter, and added dropwise to a 0.8 weight % sodium alginate water solution at a rate of 100 drops per minute, thereby surrounding the emulsion with membranes of calcium alginate to form capsules.

(6) Heating

The capsules thus formed are taken out of the alginate solution, soaked in water for 10 hours, and 7.5 parts of the capsules are heated in 2.5 parts of a condiment liquid consisting of 0.1 weight % of calcium chloride, 5 weight % of a salmon meat extract, and 2 weight % of a gardenia color dissolved in water at 80° C. for 60 minutes, thereby obtaining edible products which are similar to salmon roe both in appearance and taste.

THIRD EMBODIMENT

(1) Preparation of a xanthene gum base 0.6 part of xanthene gum, 13 parts of glucose, and 1 part of calcium chloride are added to 84.8 parts of water, the mixture is heated at 80° C. with stirring, and cooled to 30° C., thus obtaining a xanthene gum base.

(2) Preparation of a carrageenin base 0.5 part of carrageenin, 0.6 part of gelatin, 1.3 part of locust bean gum, 13 parts of glucose, and 1 part of calcium chloride are added to 83.6 parts of water, and the mixture is heated at 80° C. with stirring to obtain a carrageenin base.

The carrageenin base is cooled to 30° C. to obtain a gelled matter.

The gelled matter obtained is crushed to a fluid state by using a Comit Roll.

(3) Preparation of a viscous fluid

Immediately prior to emulsifying, 3 parts of the xanthene gum base and 7 parts of the fluidized carrageenin base are mixed to obtain a viscous fluid.

(4) Preparation of an emulsion 89.9 parts of the viscous fluid are placed in a Poppart mixer, and 10 parts of soybean salad oil containing 0.1 part of $\beta$-carotene are poured into the mixer with agitation to obtain an emulsion.

(5) Formation of capsules

The emulsion is formed into drops of 6 mm in diameter through a nozzle of 5 mm in inner diameter, and added dropwise to a 0.8 weight % sodium alginate water solution containing 0.015 weight % of a fatty acid ester of cane sugar at a rate of 100 drops per minute, thereby surrounding the emulsion with membranes of calcium alginate to form capsules.

(6) Heating

The capsules thus formed are taken out of the alginate solution, soaked in water for 10 hours, and 7.5 parts of the capsules are heated in 2.5 parts of a condiment liquid consisting of 0.1 weight % of calcium chloride, 5 weight % of a salmon meat extract, and 2 weight % of a gardenia color dissolved in water at 80° C. for 60 minutes, thereby obtaining edible products which are similar to salmon roe both in appearance and taste.

FOURTH EMBODIMENT

(1) Preparation of a xanthene gum base 0.6 part of xanthene gum, 13 parts of glucose, and 1 part of calcium chloride are added to 84.8 parts of water, the mixture is heated at 80° C. with stirring, and cooled to 30° C., thus obtaining a xanthene gum base.

(2) Preparation of a gelatin base 1.1 part of gelatin, 1.3 part of locust bean gum, 13 parts of glucose, 1 part of calcium chloride, and 0.01 part of a fatty acid ester of cane sugar are added to 83.59 parts of water, and the mixture is heated at 80° C. with stirring to obtain a gelatin base.

The gelatin base is cooled to 30° C. to obtain a gelled matter.

The gelled matter obtained is crushed to a fluid state by using a Comit Roll.

(3) Preparation of a viscous fluid

Immediately prior to emulsifying, 3 parts of the xanthene gum base and 7 parts of the fluidized gelatin base are mixed to obtain a viscous fluid.

(4) Preparation of an emulsion 89.9 parts of the viscous fluid are placed in a Poppart mixer, and 10 parts of soybean salad oil containing 0.1 part of $\beta$-carotene are poured into the mixer with agitation to obtain an emulsion.

(5) Formation of capsules

The emulsion is formed into drops of 6 mm in diameter through a nozzle of 5 mm in inner diameter, and added dropwise to a 0.8 weight % sodium alginate water solution at a rate of 100 drops per minute, thereby surrounding the emulsion with membranes of calcium alginate to form capsules.

(6) Heating

The capsules thus formed are taken out of the alginate solution, soaked in water for 10 hours, and 7.5 parts of the capsules are heated in 2.5 parts of a condiment liquid consisting of 0.1 weight % of calcium chloride, 5 weight % of a salmon meat extract, and 2 weight % of a gardenia color dissolved in water at 80° C. for 60 minutes, thereby obtaining edible products which are similar to salmon roe both in appearance and taste.

FIFTH EMBODIMENT

(1) Preparation of a viscous fluid/pasted starch base 1.25 part of carrageenin, 10 parts of glucose, 1 part of calcium chloride, and 1.2 part of processed starch are added to 87.55 parts of water, and the mixture is heated at 85° C. with stirring to obtain a sol liquid.

The sol liquid is kept at 30° C. for 30 minutes to obtain a gelled matter.

The gelled matter is homogenized by a Comit Roll to obtain a viscous fluid.

(2) Preparation of an emulsion 89.9 parts of the viscous fluid are placed in a Poppart mixer, and 10 parts of soybean salad oil containing 0.1 part of $\beta$-carotene are poured into the mixer with agitation to obtain an emulsion. (3) Formation of capsules The emulsion is formed into drops of 6 mm in diameter through a nozzle of 5 mm in inner diameter, and added dropwise to a 0.8 weight % sodium alginate water solution at a rate of 100 drops per minute. The emulsion drops sink into the solution and are surrounded with membranes of calcium alginate to form capsules. The capsules are swelled with water to a diameter of about 8 mm after they are kept immersed in the solution for 2 minutes, and then taken out of the solution.

(4) Hot water soaking

The capsules are soaked in hot water containing 0.05 weight % of $\alpha$-amylase, adjusted at 60° C. and PH 5.5, for 1 hour. The emulsion clearly separates into the oil phase and the aqueous phase. Hot water soaking is continued at 40° C. for further 10 hours, and the capsules shrink to a diameter of about 6 mm at the end of hot water soaking, thereby obtaining fish-egg-like edible products.

(5) Dipping in a condiment liquid

The fish-egg-like edible products taken out of water are dipped into a condiment liquid containing 0.05 weight % of calcium chloride, 5 weight % of anchovy sauce, and 0.1 weight % of a gardenia color for about 10 hours for seasoning and coloring, thereby obtaining fish-egg-like edible products which are similar to salmon roe both in appearance and taste.

I claim:

1. A method for preparing fish-egg-like edible products comprising capsules consisting of membranes of calcium alginate containing separate aqueous and oil phases in each said capsule comprising
   a. preparing a viscous emulsion comprising a viscous fluid consisting of a viscosity imparting agent and water, a calcium salt, and an oil material,
   b. forming capsules by dropping droplets of said emulsion into an alginate water solution and thereby surrounding said emulsion droplets with membranes of calcium alginate, and
   c. separating said emulsion in said capsules into an aqueous phase consisting of said viscous fluid and an oil phase consisting of said oil material by heating said capsules to at least 45° C. for a time sufficient to cause said separating.

2. A method for preparing fish-egg-like edible products as claimed in claim 1 wherein said emulsion or said alginate water solution is mixed with 5 to 1,000 ppm total weight based on said capsules of at least one surface active agent selected from the group consisting of a fatty acid ester of cane sugar, a fatty acid ester of sorbitan, and lecithin.

3. A method for preparing fish-egg-like edible products as claimed in claim 1 wherein said viscosity imparting agent is selected from the group consisting of xanthene gum, locust bean gum, guar gum, gelatin, carrageenin, furcellaran, and mixtures thereof.

4. A method for preparing fish-egg-like edible products as claimed in claim 3 wherein said viscosity imparting agent is selected from the group consisting of xanthene gum, gelatin, locust bean gum, or mixtures thereof.

5. A method for preparing fish-egg-like edible products as claimed in claim 1 wherein said viscous fluid contains a water-soluble food coloring matter and a water-soluble fish or crabmeat extract.

6. A method for preparing fish-egg-like edible products as claimed in claim 1 wherein said oil material is selected from the group consisting of soybean oil, rapeseed oil, fish oil, lard, and mixtures thereof mixed with a fat-soluble coloring matter, a fat-soluble preservative, or mixtures thereof.

7. A method for preparing fish-egg-like edible products comprising capsules consisting of membranes of calcium alginate containing separate aqueous and oil phases in each said capsule comprising
   a. preparing a viscous emulsion comprising a viscous fluid consisting of a viscosity imparting agent and water, a pasted starch, a calcium salt, and an oil material,
   b. forming capsules by dropping droplets of said emulsion into an alginate water solution and thereby surrounding said emulsion droplets with membranes of calcium alginate, and
   c. separating said emulsion in said capsules into an aqueous phase and an oil phase by soaking said capsules in an aqueous solution of amylase at a temperature and for a time sufficient to degrade said pasted starch and cause said separating.

8. A method for preparing fish-egg-like edible products as claimed in claim 7 wherein said emulsion is prepared by adding said agent, said calcium salt, and said pasted starch to water at a temparature sufficient to obtain a sol liquid, said sol liquid being cooled to obtain a gelled matter, said gelled matter is crushed to obtain said viscous fluid containing said pasted starch, and said viscous fluid is mixed with said oil material and emulsified.

9. A method for preparing fish-egg-like edible products as claimed in claim 7 wherein said viscosity imparting agent is selected from the group consisting of xanthene gum, locust bean gum, guar gum, gelatin, carrageanin, furcellaran, and mixtures thereof.

10. A method for preparing fish-egg-like edible products as claimed in claim 9 wherein said viscosity imparting agent is selected from the group consisting of xanthene gum, gelatin, locust bean gum, or mixtures thereof.

11. A method for preparing fish-egg-like edible products as claimed in claim 7 wherein said viscous fluid contains a water-soluble food coloring matter and a water-soluble fish or crabmeat extract.

12. A method for preparing fish-egg-like edible products as claimed in claim 7 wherein said oil material is selected from the group consisting of soybean oil, rapeseed oil, fish oil, lard, and mixtures thereof mixed with a fat-soluble coloring matter, a fat-soluble preservative, or mixtures thereof.

13. A method for preparing fish-egg-like edible products comprising capsules consisting of membranes of calcium alginate containing separate aqueous and oil phases in each said capsule comprising
   a. preparing a viscous emulsion comprising a viscous fluid consisting of a viscosity imparting agent and water, pasted starch, a calcium salt, and an oil material,
   b. forming capsules by dropping droplets of said emulsion into an alginate water solution containing sufficient amylase to subsequently degrade said pasted starch and thereby surrounding said emulsion droplets with membranes of calcium alginate, and
   c. preparing capsules having said aqueous phase and said oil phase separately contained by soaking said capsules in water at a temperature and for a time sufficient to degrade said starch and cause said separating.

14. A method for preparing fish-egg-like edible products as claimed in claim 13 wherein said emulsion is prepared by adding said agent, said calcium salt, and said pasted starch to water at a temperature sufficient to obtain a sol liquid, said sol liquid being cooled to obtain a gelled matter, said gelled matter is crushed to obtain said viscous fluid containing said pasted starch, and said viscous fluid is mixed with said oil material and emulsified.

15. A method for preparing fish-egg-like edible products as claimed in claim 13 wherein said viscosity imparting agent is selected from the group consisting of xanthene gum, locust bean gum, guar gum, gelatin, carrageenin, furcellaran, and mixtures thereof.

16. A method for preparing fish-egg-like edible products as claimed in claim 15 wherein said aqueous sol material is selected from the group consisting of xanthene gum, gelatin, locust bean gum, and mixtures thereof.

17. A method for preparing fish-egg-like edible products as claimed in claim 13 wherein said viscous fluid contains a water-soluble food coloring matter and a water-soluble fish or crabmeat extract.

18. A method for preparing fish-egg-like edible products as claimed in claim 13 wherein said oil material is selected from the group consisting of soybean oil, rapeseed oil, fish oil, lard, and mixtures thereof mixed with a fat-soluble coloring matter, a fat-soluble preservative, or mixtures thereof.

19. A fish-egg-like edible product produced by the process of claim 1, 7, or 13.

* * * * *